United States Patent
Kong et al.

(10) Patent No.: US 11,010,358 B2
(45) Date of Patent: May 18, 2021

(54) DATA MIGRATION METHOD AND SYSTEM

(71) Applicant: TENCENT TECHNOLOGY (SHENZHEN) COMPANY LIMITED, Shenzhen (CN)

(72) Inventors: Deyu Kong, Shenzhen (CN); Si Chen, Shenzhen (CN); Dong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 16/357,581

(22) Filed: Mar. 19, 2019

(65) Prior Publication Data
US 2019/0213175 A1 Jul. 11, 2019

Related U.S. Application Data

(63) Continuation of application No. PCT/CN2017/111586, filed on Nov. 17, 2017.

(30) Foreign Application Priority Data
Dec. 26, 2016 (CN) .......................... 201611219349.X

(51) Int. Cl.
*G06F 16/00* (2019.01)
*G06F 16/21* (2019.01)
(Continued)

(52) U.S. Cl.
CPC ........ *G06F 16/214* (2019.01); *G06F 11/1448* (2013.01); *G06F 16/128* (2019.01);
(Continued)

(58) Field of Classification Search
CPC .............. G06F 16/128; G06F 16/1752; G06F 16/1827; G06F 16/214; G06F 16/284;
(Continued)

(56) References Cited

U.S. PATENT DOCUMENTS 9,495,427 B2 * 11/2016 Abadi ................ G06F 16/2471
9,940,059 B2 * 4/2018 Agrawal ............ G06F 16/1752
(Continued)

FOREIGN PATENT DOCUMENTS

CN 1786920 A 6/2006
CN 101997884 A 3/2011
(Continued)

OTHER PUBLICATIONS

Survey on Mongodb: An Opensource Document Database, Agrawal et al., (Year: 2015).*
(Continued)

*Primary Examiner* — Jean M Corrielus
(74) *Attorney, Agent, or Firm* — Anova Law Group, PLLC

(57) ABSTRACT

A data migration method and system is provided. The system includes a central control node, a first shard storage space associated with a first agent node, a second shard storage space associated with a second agent node, and a data backup subsystem. The data backup subsystem stores chunks of the first shard storage space and chunks of the second shard storage space. The central control node sends a data migration command to the first agent node. The first agent node obtains a to-be-migrated first chunk by using the data backup subsystem. The first agent node sends the to-be-migrated first chunk to the second agent node. The second agent node imports the to-be-migrated first chunk into the second shard storage space.

20 Claims, 8 Drawing Sheets

(51) Int. Cl.
*G06F 16/27* (2019.01)
*G06F 16/174* (2019.01)
*G06F 16/182* (2019.01)
*G06F 16/11* (2019.01)
*G06F 11/14* (2006.01)

(52) U.S. Cl.
CPC ...... *G06F 16/1752* (2019.01); *G06F 16/1827* (2019.01); *G06F 16/27* (2019.01)

(58) Field of Classification Search
CPC ........ G06F 16/21; G06F 16/11; G06F 16/174; G06F 16/27; G06F 16/182; G06F 16/00; G06F 17/00; G06F 17/30; G06F 11/1448; G06F 11/1458; G06F 11/14; G06F 11/16; G06F 2201/84; G06F 2201/80; G06F 3/067; G06F 16/3329; G06F 16/353; G06F 16/35; G06F 16/332; G06F 17/2705; G06F 17/2785; G06F 17/27
See application file for complete search history.

(56) References Cited

U.S. PATENT DOCUMENTS

| | | | | |
|---|---|---|---|---|
| 2006/0129615 | A1* | 6/2006 | Derk | G06F 11/1464 |
| 2010/0235323 | A1* | 9/2010 | Zhang | G06F 16/113 |
| | | | | 707/623 |
| 2015/0154200 | A1* | 6/2015 | Lightner | G06F 16/13 |
| | | | | 707/693 |
| 2015/0193465 | A1 | 7/2015 | Schoeffler et al. | |
| 2015/0212896 | A1* | 7/2015 | Pawar | G06F 16/128 |
| | | | | 707/648 |
| 2016/0306709 | A1* | 10/2016 | Shaull | G06F 16/27 |
| 2016/0306819 | A1* | 10/2016 | Agrawal | G06F 11/14 |
| 2017/0103092 | A1* | 4/2017 | Hu | G06F 16/278 |
| 2017/0235507 | A1* | 8/2017 | Sinha | G06F 11/2025 |
| | | | | 711/114 |
| 2017/0286233 | A1* | 10/2017 | Dain | G06F 16/24568 |
| 2017/0295235 | A1* | 10/2017 | Guo | H04L 41/0806 |

FOREIGN PATENT DOCUMENTS

| | | |
|---|---|---|
| CN | 105426439 A | 3/2016 |
| CN | 105468473 A | 4/2016 |
| CN | 106055698 A | 10/2016 |
| CN | 106777225 A | 5/2017 |

OTHER PUBLICATIONS

The World Intellectual Property Organization (WIPO) International Search Report for PCT/CN2017/111586 dated Feb. 14, 2018 6 Pages (including translation).
The State Intellectual Property Office of the People's Republic of China (SIPO) Office Action 2 for 201611219349.X dated Nov. 27, 2019 7 Pages (including translation).

* cited by examiner

DATA MIGRATION METHOD AND SYSTEM

RELATED APPLICATIONS

This application is a continuation application of PCT Patent Application No. PCT/CN2017/111586, filed on Nov. 17, 2017, which claims priority to Chinese Patent Application No. CN 201611219349.X, entitled "DATA MIGRATION METHOD AND SYSTEM" filed on Dec. 26, 2016, the entire contents of both of which are incorporated herein by reference.

FIELD OF TECHNOLOGY

The present disclosure relates to the field of computer technologies, and in particular, to a data migration method and system.

BACKGROUND OF THE DISCLOSURE

Since development of Internet websites, a conventional relational database has many problems related to processing of a web 2.0 pure dynamic website that has hyperscale and high-concurrent social networking services (SNS), and the problems are hard to overcome. However, a non-relational database (Not Only Structured Query Language, NoSQL) rapidly develops due to features of the database. The NoSQL database may resolve a challenge resulted from a large-scale data set, and especially, resulted from big data application.

MongoDB is a distributed NoSQL database, and is intended to provide an extensible high-performance data storage solution for network application. However, migration solution of the native MongoDB has at least the following technical defects: (1) In an existing migration solution of the native MongoDB, on-line real-time data migration is adopted. This needs reading a chunk on a source data shard. Normal read/write of the MongoD by a user can be affected during reading the chunk. Consequently, the user fails in reading/writing the chunk. (2) In the migration solution of the native MongoDB, data migration is limited by the distributed lock and is a single-thread process, and the data migration efficiency is very low.

SUMMARY

The present disclosure provides a data migration method and system, to complete migration of a chunk without affecting normal reading/writing of a chunk by a user, and the data migration method and system have a very high data migration efficiency.

To resolve the foregoing technical problems, the embodiments of the present disclosure provide the following technical solutions:

According to a first aspect, an embodiment of the present disclosure provides a data migration method applied to a data migration system. The method includes: sending, by a central control node of the data migration system, a data migration command to a first agent node of the data migration system, the first agent node being associated with a first shard storage space; and obtaining, by the first agent node, a to-be-migrated first chunk by using the data backup subsystem after the first agent node receives the data migration command sent by the central control node. The method also includes sending, by the first agent node, the to-be-migrated first chunk to a second agent node of the data migration system, the second agent node being associated with a second shard storage space; and importing, by the second agent node, the to-be-migrated first chunk into the second shard storage space.

According to the data migration method provided in the first aspect, the central control node is disposed, independent of all shard storage spaces, in the data migration system, and migration of the first chunk is controlled by the central control node and is no longer limited by a distributed lock. Therefore, when there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space, a user still can normally complete a read/write operation on the first shard storage space.

According to a second aspect, an embodiment of the present disclosure provides a data migration system, including: a central control node, a first shard storage space configured with a first agent node, a second shard storage space configured with a second agent node, and a data backup subsystem. The central control node is configured to send a data migration command to the first agent node. The first agent node is configured to: after receiving the data migration command sent by the central control node, obtain a to-be-migrated first chunk by using the data backup subsystem; and send the to-be-migrated first chunk to the second agent node. The second agent node is configured to import the to-be-migrated first chunk into the second shard storage space.

According to the data migration system provided in the second aspect, the central control node is disposed, independent of all shard storage spaces, in the data migration system, and migration of the first chunk is controlled by the central control node and is no longer limited by a distributed lock. Therefore, when there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space, a user still can normally complete a read/write operation on the first shard storage space.

According to a third aspect, an embodiment of the present disclosure provides a data migration device, including:

a processor and a memory, the memory being configured to: store program code, and transmit the program code to the processor; and the processor being configured to perform the foregoing data migration method based on an instruction in the program code.

According to a fourth aspect, an embodiment of the present disclosure provides a storage medium, configured to store program code, and the program code being used to perform the foregoing data migration method.

According to a fifth aspect, an embodiment of the present disclosure provides a computer program product including an instruction, the computer program product, when run on a computer, causing the computer to perform the foregoing data migration method.

It may be learned from the foregoing technical solutions that the embodiments of the present disclosure have the following advantages:

In the embodiments of the present disclosure, the data migration system includes the central control node, the first shard storage space, the second shard storage space, and the data backup subsystem. The data backup subsystem stores chunks of the first shard storage space and chunks of the second shard storage space. The central control node sends a data migration command to the first agent node. After the first agent node receives the data migration command sent by the central control node, the first agent node obtains a to-be-migrated first chunk by using the data backup subsystem. The first agent node sends the to-be-migrated first chunk to the second agent node. The second agent node imports the to-be-migrated first chunk into the second shard storage space. The central control node is disposed, independent of all shard storage spaces, in the data migration system, and migration of the first chunk is controlled by the central control node and is no longer limited by a distributed lock. When there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space. Therefore, a user still can normally complete a read/write operation on the first shard storage space.

DESCRIPTION OF EMBODIMENTS

Figure 1:
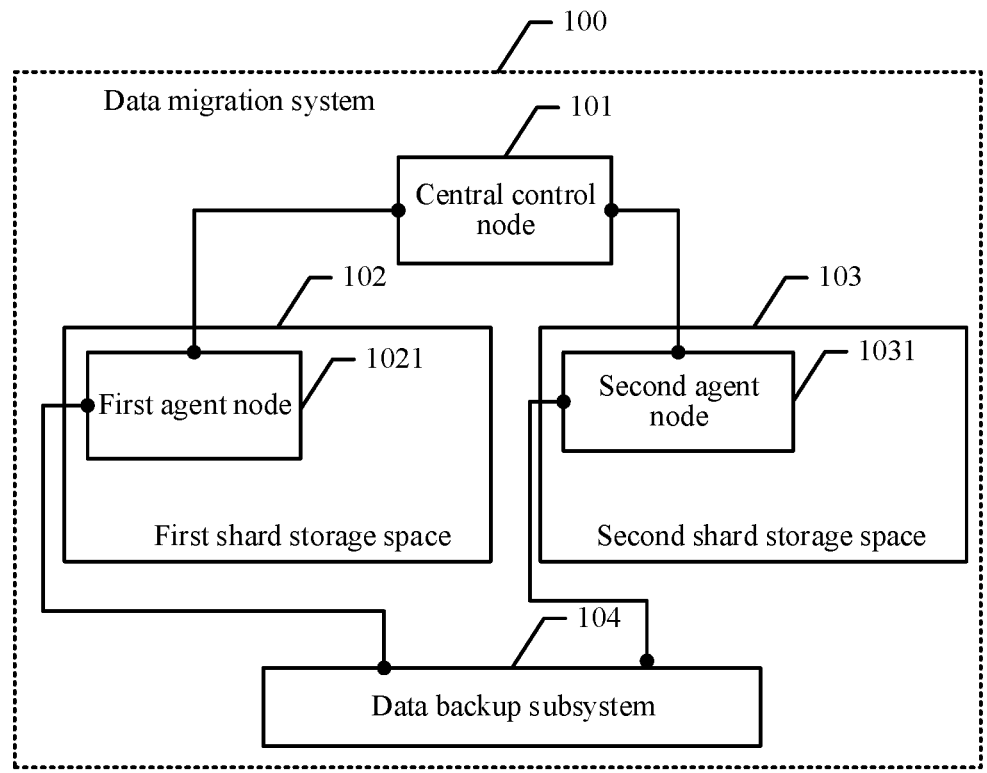
FIG. 1 is a schematic composition diagram of a data migration system according to an embodiment of the present disclosure.

Embodiments of the present disclosure provides a data migration method and system, to complete migration of a chunk without affecting normal reading/writing of a chunk by a user, and the data migration method and system have a very high data migration efficiency.

In order to make objectives, characteristics, and advantages of the present disclosure clearer and more comprehensible, the technical solutions in the embodiments of the present disclosure will be clearly and completely described in the following with reference to the accompanying drawings. It is obvious that the embodiments to be described below are only some rather than all of the embodiments of the present disclosure. All other embodiments obtained by persons of ordinary skill in the art based on the embodiments of the present disclosure without creative efforts shall fall within the protection scope of the present disclosure.

In the specification, claims, and the foregoing drawings, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

A data migration method provided in the embodiments of the present disclosure may be specifically applied to a migration scenario of a chunk between shard storage spaces, to resolve problems that the chunk migration efficiency of a conventional manner is low and a normal write/read operation of a user is affected.

Embodiments of the present disclosure may be applied in conjunction with any suitable databases, such as a MongoDB. MongoDB is a distributed NoSQL database, and is intended to provide an extensible high-performance data storage solution for network application. The MongoDB is between the relational database and the non-relational database. A query language supported by the MongoDB is very strong, may nearly implement most of functions of single table query that are similar to those of the relational database, and also supports establishing an index for data.

The MongoDB has three components: Mongos, ConfigSvr, and MongoD. The Mongos appropriates, based on a shared key set by an administrator, data into a MongoD cluster managed by the Mongos, and the ConfigSvr stores configuration information. The MongoDB logically divides a database table into 8192 chunks (chunk). In a migration solution of a native MongoDB, a balancer (balancer) module is disposed on each Mongos. Migration of a chunk is performed by the balancer module. The balancer module is a thread module instead of an independent service. The Mongos registers a distributed lock in ConfigSvr, to ensure that only one balancer module performs the migration at a same time. For distribution of chunks of each database table, the balancer module calculates chunks that need migration and that are in the database table and a database table to which each chunk needs to be migrated. A calculation process is implemented by the BalancerPolicy class. For each database table, an attempt is made to obtain a distributed lock of the database table.

In a data migration process of the MongoDB, all database tables share a same distributed lock. If that the distributed lock succeeds is obtained, a chunk migration command is initiated to a source data shard. If that the distributed lock fails is obtained, it indicates that the database table has a migration task that is currently performed. Therefore, for a same database table, only one migration task can be performed at a same time. Although the database table is distributed on different data shards, because all the database table share the same distributed lock, the distributed lock is allocated only after a previous database table uses the distributed lock. Embodiments of the present disclosure provides an advanced data migration method than the native migration solution of MongoDB.

In the data migration method provided in the embodiments of the present disclosure, system network elements such as a central control node, multiple shard storage space, and a data backup subsystem are involved. In the embodiments of the present disclosure, a central control node is disposed in a data migration system. The central control node is a management device for scheduling chunk migration. Chunk migration between each shard storage space is completed under management of the central control node. The shard storage space is a storage device for storing data allocation. For example, the shard storage space may be a MongoD cluster, or may be another distributed storage cluster, or may be a shared storage cluster used to implement a web service. One agent node is disposed on each shard storage space. The agent node communicates with the central control node. The user performs data monitoring and module deployment by using the agent node. The agent node may distribute a task. In the embodiments of the present disclosure, in addition to that the shard storage space are configured to store chunks, a data backup subsystem is further disposed in the data migration system. A chunk stored in each shard storage space is backed up in the data backup subsystem. Moreover, the agent node may interact with the data backup subsystem, to complete a read/write operation request of a chunk. For example, the data backup subsystem may be a distributed storage system, such as a distributed file system (e.g., Hadoop distributed file system, HDFS).

A concept of the present disclosure is described below with reference to the descriptions of the foregoing data migration system:

The data migration method provided in the embodiments of the present disclosure is applied to a data migration system. The system includes a central control node, a first shard storage space, a second shard storage space, and a data backup subsystem. The data backup subsystem stores chunks of the first shard storage space and chunks of the second shard storage space. The first shard storage space is configured with a first agent node, and the second shard storage space is configured with a second agent node.

It should be noted that the data migration system may further include more shard storage spaces, and each shard storage space is correspondingly configured with an agent node. For convenience of description, the concept of the present disclosure is described by using a data migration system that includes only two shard storage spaces.

The central control node sends a data migration command to the first agent node. As a source node, after receiving the data migration command sent by the central control node, the first agent node obtains a to-be-migrated first chunk by using the data backup subsystem. The first agent node sends the to-be-migrated first chunk to the second agent node used as a destination/target node. The second agent node imports the to-be-migrated first chunk into the second shard storage space.

It should be noted that the first agent node may alternatively be a destination node, and the second agent node may alternatively be a source node. That is, both the source node and the destination node may be determined based on an actual requirement.

The central control node is disposed, independent of all shard storage spaces, in the data migration system, and migration of the first chunk is controlled by the central control node and is no longer limited by a distributed lock. When there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space. Therefore, a user still can normally complete a read/write operation on the first shard storage space.

Based on the descriptions of the foregoing concept, the data migration method provided in the embodiments of the present disclosure is described.

In the data migration system provided in the embodiments of the present disclosure, referring to FIG. 1, the data migration method is applied to a data migration system 100. The data migration system 100 includes a central control node 101, a first shard storage space 102, a second shard storage space 103, and a data backup subsystem 104, where the first shard storage space 102 is configured with a first agent node 1021, the second shard storage space 103 is configured with a second agent node 1031, chunks stored in the first shard storage space 102 are backed up to the data backup subsystem 104 by using the first agent node 1021, and chunks stored in the second shard storage space 103 are backed up to the data backup subsystem 104 by using the second agent node 1031.

Figure 2:
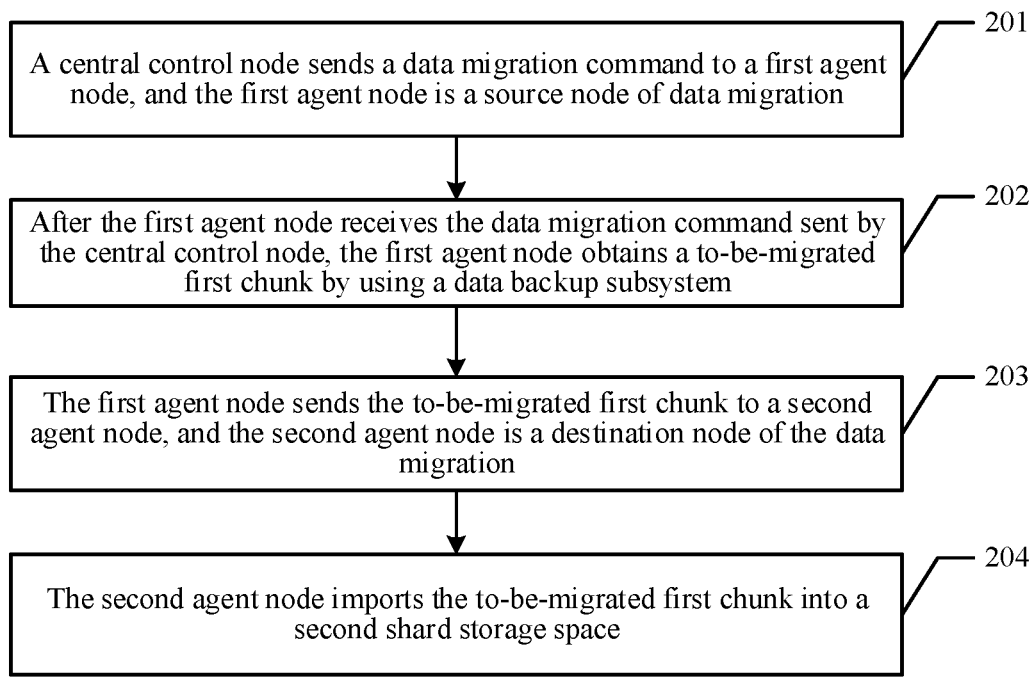
FIG. 2 is a schematic block flowchart of a data migration method according to an embodiment of the present disclosure.

Referring to FIG. 2, a data migration method provided in an embodiment of the present disclosure may include the following steps:

201. A central control node sends a data migration command to a first agent node.

In one embodiment of the present disclosure, the central control node is a management device for scheduling chunk migration. Chunk migration between each shard storage space is completed under management of the central control node. When data stored in a first shard storage space needs to be migrated, the first agent node configured in the first shard storage space is a source node of data migration, and the central control node sends the data migration command to the first agent node. The data migration command may carry an identifier of a to-be-migrated chunk.

For example, a distributed storage cluster includes multiple shard storage spaces. When a capacity of the distributed storage cluster needs to be expanded, a new shard storage space is added. In this case, some chunks stored in the existing shard storage spaces need to be migrated to the new shard storage space, to implement data balance. For another example, load of a shard storage space is very low. To reduce costs, a capacity of the distributed storage cluster is narrowed. Chunks in the shard storage space needing to be removed are proportionately migrated to the other shard storage spaces.

In one embodiment of the present disclosure, the central control node may be used as a control end of chunk migration. Each agent node establishes a communications connection to the central control node. Each agent node completes chunk migration under control of the central control node. The chunk migration is controlled by the central control node, and is no longer limited by a distributed lock. When a chunk needs to be migrated, each chunk may be migrated independently. Therefore, the data migration efficiency is very high. For example, when two shard storage spaces of a data migration system both need chunk migration, the central control node may send data migration commands respectively to agent nodes of the two shard storage spaces in a manner of step 201.

202. After the first agent node receives the data migration command sent by the central control node, the first agent node obtains a to-be-migrated first chunk by using a data backup subsystem.

In one embodiment of the present disclosure, the first agent node respectively establishes communications connection to the central control node and the data backup subsystem. If the first agent node receives the data migration command of the central control node, because the data backup subsystem stores chunks of the first shard storage space, the first agent node may obtain, by using the data backup subsystem, a first chunk that is backed up and stored in the data backup subsystem. In this case, although a migration command of the first chunk is currently executed in the first shard storage space, the first agent node obtains the first chunk from the data backup subsystem without affecting a normal operation of a user on the first shard storage space.

203. The first agent node sends the to-be-migrated first chunk to a second agent node.

In one embodiment of the present disclosure, after the first agent node determines the to-be-migrated first chunk, if the first chunk needs to be migrated to a second shard storage space, the second shard storage space is configured with the second agent node. The second agent node is a destination node of the data migration. The first agent node may send the to-be-migrated first chunk to the second agent node. For example, the first agent node completes communication of the first agent node and the second agent node under scheduling of the central control node. For another example, the first agent node and the second agent node completes communication of the first chunk by using an internal communication protocol.

204. The second agent node imports the to-be-migrated first chunk into a second shard storage space.

In one embodiment of the present disclosure, the second agent node receives the to-be-migrated first chunk from the first agent node, and then the second agent node imports the to-be-migrated first chunk into the second shard storage space, to complete a migration process of the first chunk.

It should be noted that in one embodiment of the present disclosure, step 201 to step 204 describe the migration process of the to-be-migrated first chunk. It may be understood that in the data migration system, if other chunks such as a second chunk and a third chunk need to be migrated, migration of the second chunk and the third chunk may be implemented based on the migration process of the first chunk in step 201 to step 204, so that concurrent migration of multiple chunks may be implemented in one embodiment of the present disclosure.

In one embodiment, the data migration system includes the central control node, the first shard storage space, the second shard storage space, and the data backup subsystem. The data backup subsystem stores chunks of the first shard storage space and chunks of the second shard storage space. The central control node sends a data migration command to the first agent node. After the first agent node receives the data migration command sent by the central control node, the first agent node obtains a to-be-migrated first chunk by using the data backup subsystem. The first agent node sends the to-be-migrated first chunk to the second agent node. The second agent node imports the to-be-migrated first chunk into the second shard storage space. The central control node is disposed, independent of all shard storage spaces, in the data migration system, and migration of the first chunk is controlled by the central control node and is no longer limited by a distributed lock. When there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space. Therefore, a user still can normally complete a read/write operation on the first shard storage space.

In some embodiments of the present disclosure, in addition to the foregoing steps, the data migration method provided in one embodiment of the present disclosure further includes the following steps:

A1. The central control node divides all data in a database table into multiple chunks.

A2. The central control node sends some of the multiple chunks to the first agent node, and sends the rest of the multiple chunks to the second agent node.

A3. The first agent node imports the some chunks received into the first shard storage space.

A4. The second agent node imports the other chunks received into the second shard storage space.

In the foregoing embodiment of the present disclosure, for all data in each database table, the central control node logically divides the all data into multiple chunks. A specific quantity of divided chunks is related to the size of the database table and a division manner. For example, a data table may be divided into 8192 chunks. The data migration system includes the first shard storage space and the second shard storage space. The central control node allocates multiple chunks to the first shard storage space and the second shard storage space. If the data migration system further includes a third shard storage space, the central control node may also allocate a chunk to the third shard storage space. This is not limited herein.

Further, in some embodiments of the present disclosure, the data migration system further includes a key value storage device. A communications connection is established between the key value storage device and the central control node. After the central control node divides all the data in the database table into multiple chunks in step A1, the data migration method provided in one embodiments of the present disclosure further includes the following steps:

B1. The central control node creates a routing table based on the multiple chunks. The routing table includes a mapping relationship between each of the multiple chunks and a shard identifier and a working status of a corresponding shard storage space, and the working status of the shard storage space corresponding to the chunk includes a normal state and a write forbidden state.

B2. The central control node stores the routing table in the key value storage device.

The key value storage device is configured to store the routing table. The central control node is connected to the key value storage device. The key value storage device may alternatively be referred to as a consistent storage device. The key value storage device may use a consistency algorithm to ensure strong consistency of data. For example, the key value storage device may be a high-available key value storage system (Etcd). The Etcd is mainly used for shared configuration and service discovery.

The routing table created by the central control node is stored in the key value storage device, and when each routing table is changed, the key value storage device needs to be modified. In one embodiment of the present disclosure, the routing table includes the mapping relationship between each of the multiple chunks and the shard identifier and a working status of the corresponding shard storage space, and the working status of the shard storage space corresponding to the chunk includes the normal state and the write forbidden state. For example, a mapping relationship of chunk_id-→(shard_id, state) is recorded in the routing table, where chunk_id represents an identifier of a chunk, shard_id is a shard identifier of a shard storage space, and state represents a working status of the shard storage space. The working status of the shard storage space corresponding to the chunk includes the normal state (NORMAL) and the write forbidden state (FORBID_WRITE). The normal state means that the shard storage space may normally provide a read/write operation request of the chunk. The write forbidden state means that the shard storage space is forbidden, and cannot provide a read/write operation request.

Further, in the foregoing scenario in which the central control node stores the routing table in the key value storage device, in some embodiments of the present disclosure, after the second agent node imports the to-be-migrated first chunk into the second shard storage space in step 204, the data migration method provided in one embodiment of the present disclosure further includes the following steps:

C1. The second agent node reports a migration success message to the central control node.

C2. The central control node changes the mapping relationship of the first chunk recorded in the routing table from the first shard storage space to the second shard storage space based on the migration success message.

The mapping relationship of the first chunk recorded in the routing table is that the first chunk is stored in the first shard storage space. If the first chunk is migrated to the second shard storage space, the routing table needs to be modified. The mapping relationship is modified to that the first chunk is stored in the second shard storage space. The central control node may modify the key value storage device.

Further, in the foregoing scenario in which the central control node stores the routing table in the key value storage device, in some embodiments of the present disclosure, the data migration system further includes a gateway (Proxy) module. Both the first agent node and the second agent node establish communications connections to the central control node by using the proxy element. After the central control node changes the mapping relationship of the first chunk recorded in the routing table from the first shard storage space to the second shard storage space based on the migration success message in step C1, the data migration method provided in one embodiment of the present disclosure further includes the following step:

D1. The central control node broadcasts a storage space change message of the routing table to the first agent node and the second agent node by using the proxy element.

Specifically, a proxy element is deployed between the first agent node and the central control node, and a proxy element is deployed between the second agent node and the central control node. Communication between the central control node and the first agent node may be completed by using the proxy element. For example, after the central control node modifies the key value storage device in step C1, the central control node sends the storage space change message of the routing table to the proxy element. The proxy element may broadcast the storage space change message of the routing table to all agent nodes.

Further, in the foregoing scenario in which the central control node stores the routing table in the key value storage device, before the first agent node obtains the to-be-migrated first chunk by using the data backup subsystem in step 202, the data migration method provided in one embodiment of the present disclosure further includes the following steps:

E1. The first agent node sends a route blocking request to the central control node.

E2. The central control node changes the working status of the first shard storage space recorded in the routing table from the normal state to the write forbidden state based on the route blocking request.

E3. The central control node broadcasts a working status change message of the routing table to the proxy element.

E4. The proxy element blocks an operation processing request of the first shard storage space based on the working status change message of the routing table.

In a data migration process, a user incessantly writes data into the first shard storage space. Before the first shard storage space migrates a chunk, the central control node may modify the working status of the first shard storage space, and update the working status from the normal state to the write forbidden state. The proxy element blocks the operation processing request of the first shard storage space based on the working status change message of the routing table. In this case, the user cannot perform the operation processing request on the first shard storage space, to avoid data written into the first shard storage space by the user at that time. However, the data cannot be migrated to the second shard storage space. Consequently, a problem of user data loss is caused.

In some embodiments of the present disclosure, in addition to the foregoing steps, the data migration method provided in one embodiment of the present disclosure further includes the following steps:

F1. The central control node periodically initiates a backup task to the first agent node and the second agent node.

F2. The first agent node periodically backs up the chunks stored in the first shard storage space to the data backup subsystem based on the backup task.

F3. The second agent node periodically backs up the chunks stored in the second shard storage space to the data backup subsystem based on the backup task.

The data backup subsystem is used as a data backup entity of all shard storage spaces. The central control node may control data backup of each agent node. For example, the central control node periodically triggers the backup task, each agent node may periodically back up chunks in a shard storage space in which the agent node is located to the data backup subsystem, so that the data backup subsystem may provide chunk backup to the agent node in the data migration process. Therefore, the agent node does not need to migrate a chunk by using the shard storage space, to not affect a response of the shard storage space to a normal read/write operation request of the user.

Further, in some embodiments of the present disclosure, step F2 that the first agent node periodically backs up the chunks stored in the first shard storage space to the data backup subsystem based on the backup task specifically includes:

F21. If it is the first time the first agent node receives the backup task after the first agent node starts and operates, the first agent node backs up all chunks currently stored in the first shard storage space, to generate a data snapshot, and backs up the data snapshot to the data backup subsystem.

F22. If it is not the first time the first agent node receives the backup task, the first agent node obtains an incremental backup log used to record modification occurred to the first shard storage space (e.g., modification to certain chunk in the shard) from the first shard storage space, and backs up the incremental backup log to the data backup subsystem. The shard storage space may keep multiple incremental backup log entries that record all modifications occurred to data in the shard storage space at least from the time of previous backup to current time.

In one embodiment of the present disclosure, all agent nodes in the data migration system may use an incremental backup manner. For example, an incremental backup process of the first agent node is described in steps F21 and F22. The second agent node may also complete an incremental backup process in this manner. If it is the first time the first agent node receives the backup task after the first agent node starts and operates, the first agent node backs up all chunks currently stored in the first shard storage space, to generate the data snapshot, and backs up the data snapshot to the data backup subsystem. If it is not the first time the first agent node receives the backup task, the first agent node each time obtains, from the first shard storage space, an incremental backup log generated from previous backup to this backup, and backs up the incremental backup log to the data backup subsystem.

For example, the shard storage space is specifically a MongoD storage cluster. During first backup, a data snapshot needs to be generated for all chunks in the MongoD storage cluster. Then, only incremental backup needs to be performed for each backup. The first agent node may obtain the incremental backup log (OplogDump) by scanning a storage log of the first shard storage space, and does not need to perform global backup of the first shard storage space each time, thereby increasing the backup efficiency of the chunks.

In a native MongoDB migration solution provided in the existing technology, a database table has only one migration task at a same time. Although the database table is divided into different data shards, concurrent chunk migration cannot be implemented. In addition, in the native MongoDB migration solution, data migration is limited by a distributed lock and is a single-thread process. Consequently, the data migration efficiency is very low. Further, to resolve this problem in one embodiment of the present disclosure, the concurrent chunk migration can also be completed by simultaneously using multiple threads. In the foregoing implementation scenario in which step F21 and step F22 are performed, step 202 that the first agent node obtains a to-be-migrated first chunk by using a data backup subsystem includes:

G1. The first agent node obtains a to-be-migrated first data snapshot from the data backup subsystem.

G2. The first agent node divides the first data snapshot into multiple snapshot blocks.

G3. The first agent node invokes multiple threads in a thread pool, to sift out a to-be-migrated snapshot block from the multiple snapshot blocks, where the to-be-migrated snapshot block belongs to the first chunk.

In one embodiment of the present disclosure, when determining the to-be-migrated first data snapshot, the first agent node may divide the first data snapshot into multiple snapshot blocks. The first agent node invokes the multiple threads in the thread pool, to sift out the to-be-migrated snapshot block from the snapshot blocks, where the to-be-migrated snapshot block belongs to the first chunk. For example, the multiple snapshot blocks corresponding to the first data snapshot have an irrelevant feature, so that multiple block filters may be used to simultaneously sift the multiple snapshot blocks, to determine the to-be-migrated snapshot block, thereby significantly increasing the chunk migration efficiency.

In the foregoing implementation scenario in which step G1 to step G3 are performed, if the data backup subsystem also stores the incremental backup log of the first shard storage space, for example, an application scenario shown in the foregoing step F21 and step F22, step 202 that the first agent node obtains a to-be-migrated first chunk by using a data backup subsystem further includes:

G4. After the first agent node invokes the multiple threads in the thread pool to identify the to-be-migrated snapshot block from the multiple snapshot blocks, the first agent node obtains to-be-migrated first incremental backup logs from the data backup subsystem. For example, each to-be-migrated snapshot block may correspond to zero, one, or more incremental backup logs depending on operations occurred on the corresponding block.

G5. The first agent node groups the to-be-migrated first incremental backup logs based on their log identifiers, to obtain multiple groups of first incremental backup logs, where the multiple groups of first incremental backup log belong to the first chunk.

The first agent node may obtain the to-be-migrated first incremental backup log from the data backup subsystem based on a data migration command/instruction. Multiple first incremental backup logs are each data of a single row/entry of the database table. Rows/Entries of the database table are irrelevant to each other. Therefore, the to-be-migrated first incremental backup log may be grouped based on the log identifier, to obtain the different groups of first incremental backup logs. The different groups of first incremental backup logs belong to the first chunk.

In an implementation scenario in which step G1 to step G3 and step G4 and step G5 are performed, in addition to the data snapshot and incremental backup log of the first shard storage space stored in the data backup subsystem, in the data migration process, when the user incessantly writes data into the first shard storage space and before the first shard storage space migrates a chunk, the central control node may modify the working status of the first shard storage space, and change the working status from the normal state to the write forbidden state. Before a status of the first shard storage space is changed to the write forbidden state, data still can be written into the first shard storage space. In this implementation scenario, step 202 that the first agent node obtains a to-be-migrated first chunk by using a data backup subsystem further includes:

G6. After the first agent node obtains the to-be-migrated first incremental backup log from the data backup subsystem, the first agent node obtains, from the first shard storage space based on a backup timestamp corresponding to the first incremental backup log, a residual incremental log already stored from the backup timestamp to a current time, where the residual incremental log belongs to the first chunk.

After the first agent node obtains the to-be-migrated first incremental backup log from the data backup subsystem, the first agent node obtains the backup timestamp corresponding to the first incremental backup log, and the first agent node further needs to obtain, from the first shard storage space, the residual incremental log already stored from the backup timestamp to the current time. For example, in a process of importing the first incremental backup log, the user still incessantly writes data into the first shard storage space. The write by the user is recorded in log data of the first shard storage space. The data written by the user is referred to as the residual incremental log.

In an implementation scenario in which step G1 to step G3, step G4 and step G5, and step G6 are performed, specifically, step 203 that the first agent node sends the to-be-migrated first chunk to the second agent node includes:

H1. The first agent node sends the to-be-migrated snapshot block to the second agent node.

H2. The first agent node simultaneously send the different groups of first incremental backup logs to the second agent node by using different sending threads.

H3. The first agent node sends the residual incremental log to the second agent node.

It may be learned from the foregoing specific application scenarios that, the to-be-migrated snapshot block belongs to the first chunk, the different groups of first incremental backup logs belong to the first chunk, and the residual incremental log belongs to the first chunk. Therefore, the first agent node may separately send the to-be-migrated snapshot block, the different groups of first incremental backup logs, and the residual incremental log to the second agent node. Because the first agent node simultaneously sends the different groups of first incremental backup logs to the second agent node by using the different sending threads, the irrelevant feature between different rows of the database table is fully utilized, so that the chunk migration efficiency is increased by simultaneously using the multiple sending threads.

It may be learned from the foregoing descriptions of one embodiment of the present disclosure that the data migration system includes the central control node, the first shard storage space, the second shard storage space, and the data backup subsystem. The data backup subsystem stores chunks of the first shard storage space and chunks of the second shard storage space. The central control node sends a data migration command to the first agent node, and the first agent node is a source node of data migration. After the first agent node receives the data migration command sent by the central control node, the first agent node obtains a to-be-migrated first chunk by using the data backup subsystem. The first agent node sends the to-be-migrated first chunk to the second agent node, and the second agent node is a destination node of the data migration. The second agent node imports the to-be-migrated first chunk into the second shard storage space. The central control node is disposed, independent of all shard storage spaces, in the data migration system, and migration of the first chunk is controlled by the central control node and is no longer limited by a distributed lock. Therefore, when there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space, the user still can normally complete a read/write operation on the first shard storage space.

For ease of understanding and implementing the foregoing solution in the embodiments of the present disclosure, specific descriptions are provided below by using an example of a corresponding application scenario.

Figure 3A:
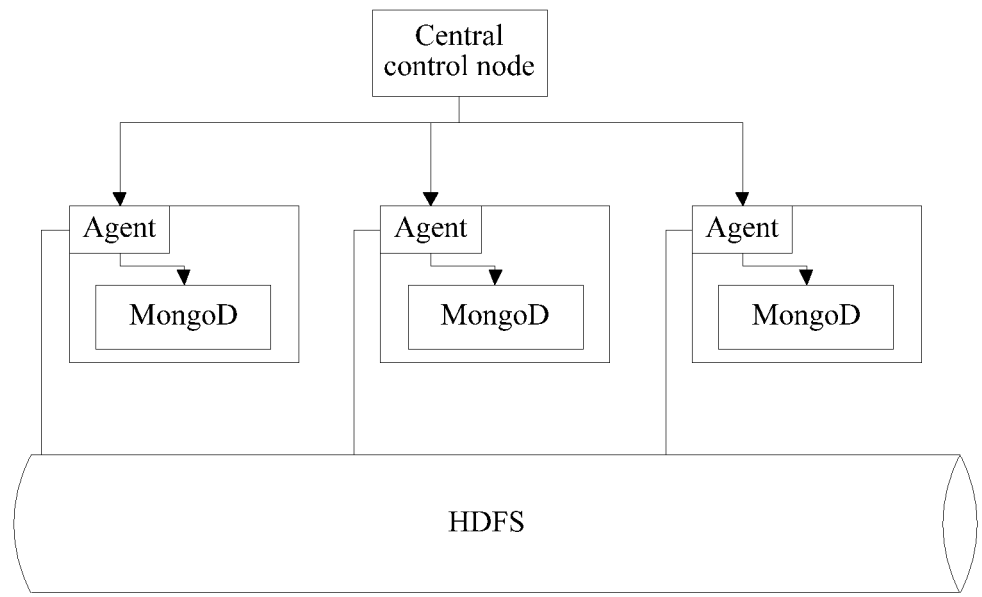
FIG. 3a is a schematic architectural diagram of a data migration system implemented based on MongoD according to an embodiment of the present disclosure.

Next, for example, the shard storage space in the embodiments of the present disclosure is specifically a MongoD cluster. Referring to FIG. 3*a*, in a data migration system implemented based on the MongoD in one embodiment of the present disclosure, the data migration system logically divides data of each database table into 8192 chunks. The chunks are placed in a consistent storage device Etcd, and are delivered by the central control node at an appropriate time and pushed to an access layer. When data in one MongoD is to be overload, a chunk needing to be migrated to another MongoD is extracted from a source MongoD by using a data snapshot and an incremental backup log OplogDump file, and the chunk is imported. In this process, a write operation generated by the source MongoD is recorded by the MongoD in an incremental log Oplog. After this Oplog is imported into a target MongoD, a write request of a chunk corresponding to the source MongoD is blocked. After the Oplog is completely synchronized, a mapping relationship between the chunk and the MongoD in the Etcd is modified.

The data migration system implemented based on the MongoD that is provided in one embodiment of the present disclosure may be used in a CMongo storage cluster. When a capacity of the cluster needs to be expanded, one data shard is newly added, and some chunks in the storage cluster are migrated to the new cluster, to implement data balance. When load of a CMongo cluster is very low, to reduce costs, a capacity of the cluster is narrowed. Chunks on a machine needing to be removed are proportionately migrated to other data shards.

Figure 3B:
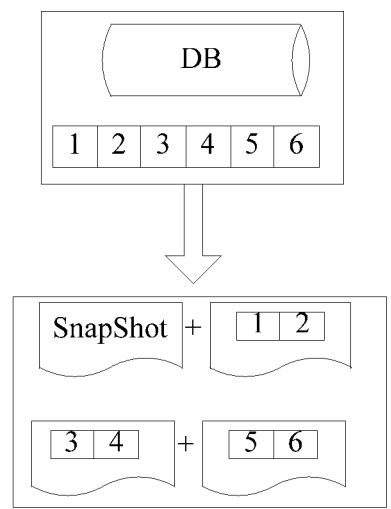
FIG. 3b is a schematic diagram of data incremental backup according to an embodiment of the present disclosure.

Referring to FIG. 3*a* and FIG. 3*b*, the central control node may periodically delivery a backup task to an agent node Agent in each MongoD shard. If the MongoD shard may further be double primary-secondary shards, the central control node may deliver the backup task to an Agent in the secondary MongoD shard. The Agent extracts a snapshot or an OplogDump from MongoD and stores the snapshot or OplogDump in an HDFS.

For example, a migration system of the CMongo depends on an incremental backup subsystem of the CMongo and a routing system. The incremental backup subsystem includes the central control node, an agent node on each MongoD machine, and a HDFS configured to store backup data. As shown in FIG. 3*b*, the task is delivered by the central control node to an Agent of a corresponding machine. A MongoD of the Agent connected to the machine obtains a Snapshot and an OplogDump. During first backup, the Snapshot needs to be obtained. Subsequently, only incremental backup is needed each time. During the incremental backup, an OplogDump from previous incremental backup till now is obtained by scanning an Oplog. A database DB in the MongoD stores chunk 1, 2, 3, 4, 5, and 6. During each backup, the chunks 1 and 2, the chunks 3 and 4, and the chunk 5 and 6 are respectively backed up to the HDFS. A data copy is equivalent to the data snapshot+the chunks 1, 2, 3, 4, 5, and 6. The SnapShot is a data snapshot of the database at a time. Idempotence is a feature that a result does not change if an operation is performed on a row of the database table for one or more times. The Oplog is a log record used to record a modification of database data having the idempotence, where the log is inserted based on a sequence of operation time, and is used for incremental data recovery. OplogDump(t) is a copy of the Oplog of the MongoD that is made from a time stamp t, and the copy is stored in the HDFS.

Figure 4:
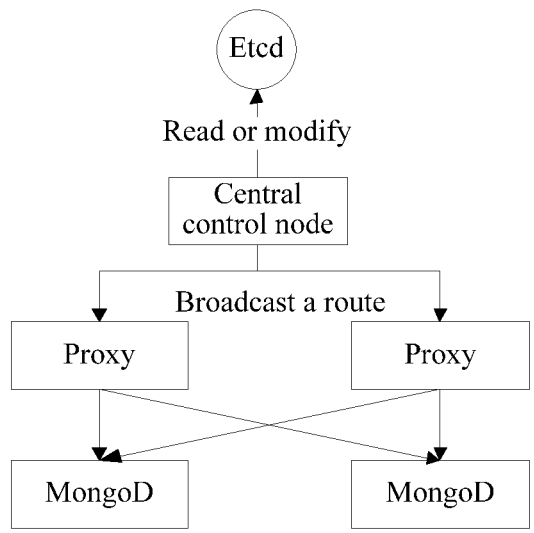
FIG. 4 is a schematic flowchart of route broadcast implemented based on MongoD according to an embodiment of the present disclosure.

Referring to FIG. 4, FIG. 4 is a schematic flowchart of route broadcast implemented based on the MongoD according to an embodiment of the present disclosure. In the routing subsystem, a database table is divided into 8192 chunks, and the routing table is a mapping relationship of chunk_id→(shard_id, state), where state includes two states: NORMAL and FORBID_WRITE. The routing table is stored in an Etcd cluster. A change of the routing table is processed by the central control node in a unified manner, and is broadcast to a front-end gateway (proxy) module. The routing table turns to the FORBID_WRITE state only at the final stage of the data migration.

Figure 5:
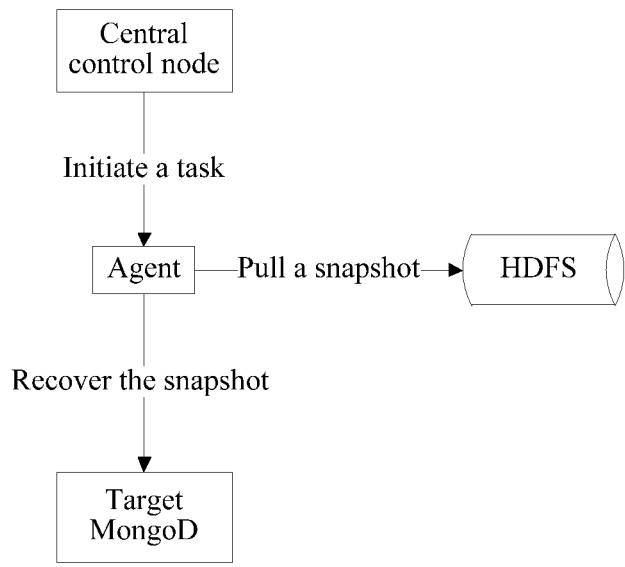
FIG. 5 is a schematic flowchart of data snapshot recovery implemented based on MongoD according to an embodiment of the present disclosure.
Figure 6:
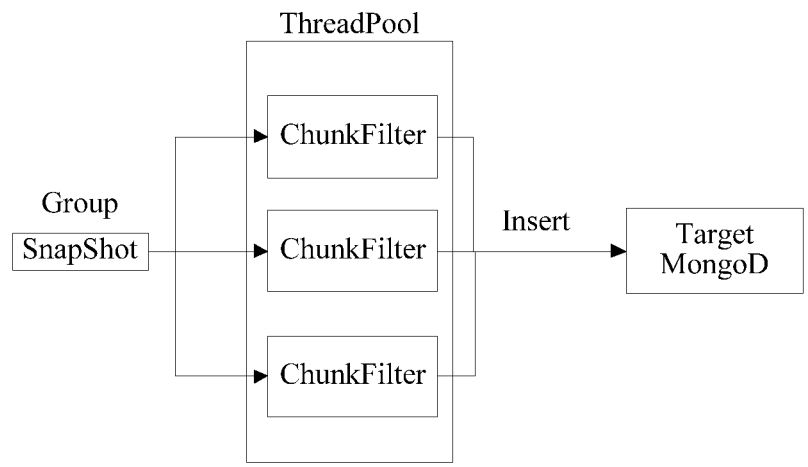
FIG. 6 is a schematic diagram of a data snapshot using multiple threads according to an embodiment of the present disclosure.

Referring to FIG. 5, FIG. 5 is a schematic flowchart of data snapshot recovery implemented based on the MongoD according to an embodiment of the present disclosure. Next, the data migration process in one embodiment of the present disclosure is described. An Agent of each MongoD machine may perform the following data migration process. The Agent receives and accepts a data migration task of the central control node, and migrates data by using a backup file stored in the HDFS and an Oplog of a source MongoD on the machine. The migration task performed by the Agent mainly includes the following steps:

Step 1: Receive a command of the central control node, and pull a corresponding Snapshot file from the HDFS. As shown in FIG. 6, FIG. 6 is a schematic diagram of a data snapshot using multiple threads according to an embodiment of the present disclosure. A thread pool is created, the Snapshot is divided into several blocks and placed in the thread pool (ThreadPool), and each thread pool sifts out a to-be-migrated chunk and migrates the chunk to a target MongoD. For a data migration task, chunks of a shard that need migration and a new shard to which the chunks need to be migrated are specified. A migrated thread pool knows information of the chunks in the migration task. For each piece of to-be-sifted data, a shard filter (e.g., ChunkFilter) is used to calculate whether the data needs to be migrated, to implement sifting, and a snapshot block after the sifting is inserted in the target MongoD.

Step 2: Pull an OplogDump list from the HDFS. Because the Oplog includes a series of operations, such as create, modify/update, and delete operations. The operations are not all insert operations the same as the Snapshot. Therefore, random grouping for the Snapshot is not allowed. However, one article in the Oplog is an operation on a single row of data, and rows are irrelevant with each other. Therefore, the OplogDump file is traversed, Hash grouping is performed based on a shard identifier ObjectId (ObjId for short) of each Oplog, and each group of data is placed in a single thread to be sequentially processed. Each row of data has a unique global Id, and the Id is referred to as an ObjId. Each Oplog is a change of a row. Therefore, each Oplog records an ObjId of a corresponding row.

Figure 7:
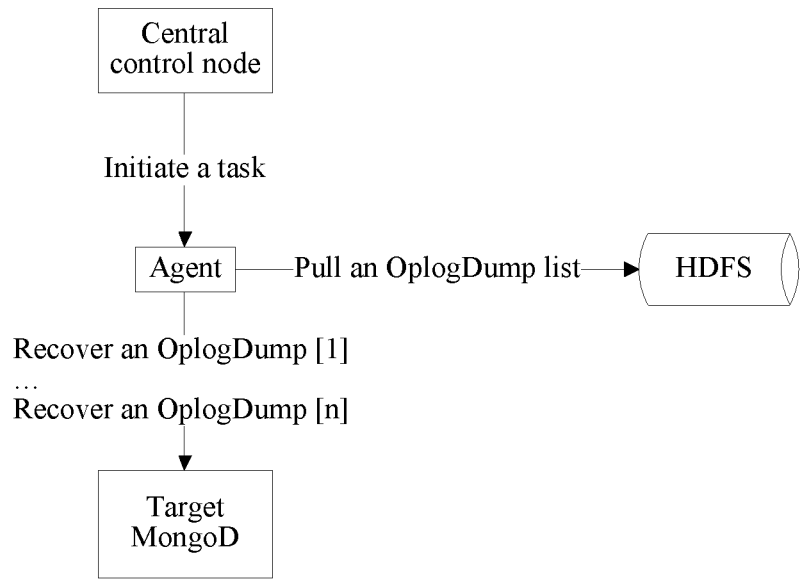
FIG. 7 is a schematic flowchart of incremental backup log recovery implemented based on MongoD according to an embodiment of the present disclosure.
Figure 8:
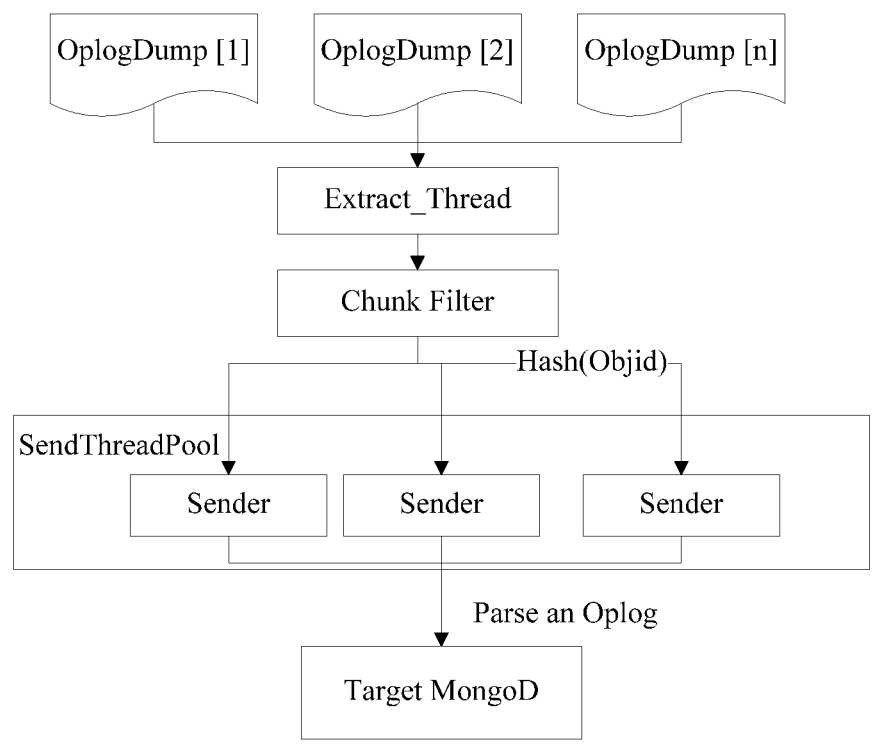
FIG. 8 is a schematic diagram of multiple incremental backup logs using multiple sending threads according to an embodiment of the present disclosure.

As shown in FIG. 7 and FIG. 8, FIG. 7 is a schematic flowchart of incremental backup log recovery implemented based on the MongoD according to an embodiment of the present disclosure, and FIG. 8 is a schematic diagram of multiple incremental backup logs using multiple sending threads according to an embodiment of the present disclosure. For total of n groups, incremental backup logs OplogDump[1] to OplogDump[n], each group of OplogDump is recovered to the target MongoD. As shown in FIG. 8, the total of n groups, OplogDump[1] to OplogDump[n], are sent to a shard filter (Chunk Filter) by using an extract thread (Extract Thread), and then Hash grouping is performed. The OplogDump[1] to OplogDump[n] are sent to the target MongoD by separately using multiple sending threads (Send) in a sending thread pool (Send ThreadPool). Parse Oplog is also referred to as applyOps. Each Oplog completely records a data modification of the user. A process that information in the Oplog is parsed out and applied to a shard is referred to as the applyOps.

Step 3: Obtain a time stamp T at which a final Oplog is backed up from the OplogDump. The Agent pulls, from the source MongoD, Oplogs from the time T to the end, to obtain a residual incremental log, and synchronize the residual incremental log to the target MongoD. A thread model of this step is consistent with a thread model of step 2. In a process of importing the OplogDump, the user still incessantly writes data. The write by the user is recorded in the Oplog of the source MongoD, and the data written by the user is referred to as a residual incremental log.

Figure 9:
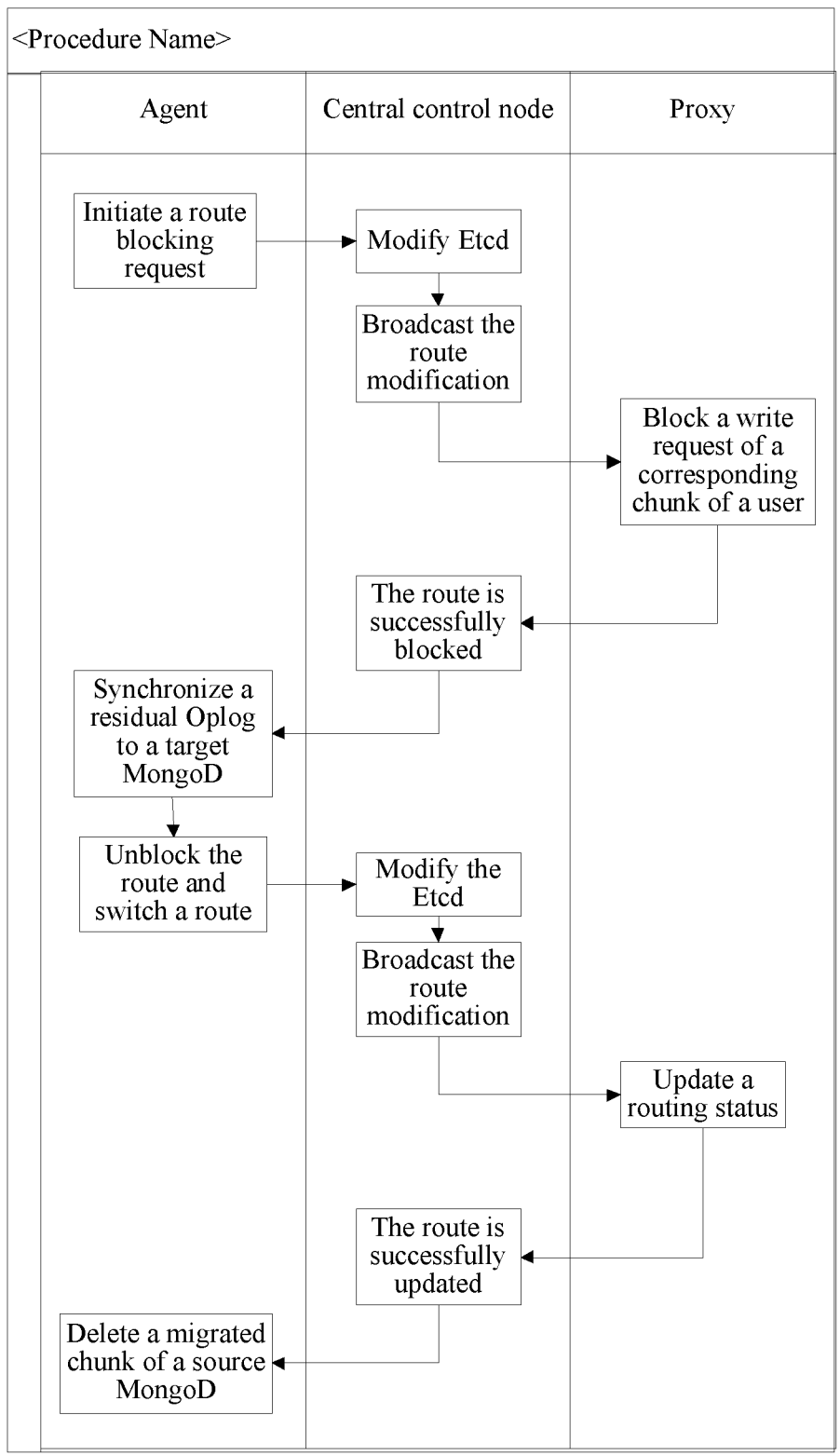
FIG. 9 is a schematic flowchart of route switching implemented based on MongoD according to an embodiment of the present disclosure.

Step 4: Perform a route switching procedure. Referring to FIG. 9, FIG. 4 is a schematic flowchart of route switching implemented based on the MongoD according to an embodiment of the present disclosure. The procedure mainly includes the following processes:

Step 4.1: Block a route, so that the user cannot write temporarily, and synchronize the residual Oplog in the source MongoD to the target MongoD. Route blocking is initiated by the Agent to the central control node. After changing routing information in the Etcd, the central control node broadcast the route change to all Proxies.

Step 4.2: A proxy blocks a write request of a corresponding chunk of the user, and after the route is successfully blocked, synchronize the residual Oplog in the source MongoD to the target MongoD.

Step 4.3: Broadcast a route again by using the central control node, and change and migrate a shard corresponding to the chunk. The central control node modifies the Etcd, and then the central control node broadcasts the route modification to the Proxy. The Proxy updates a routing status. The central control node determines that the route is successfully updated.

Step 4.4: The Agent deletes a migrated chunk on the shard of the source MongoD.

It may be learned from the foregoing examples that in one embodiment of the present disclosure, data backup and data migration are perfectly combined, thereby significantly increasing an existence value of a backup file. The data backup is mainly used for data retracement. When snapshots are imported, the snapshots are concurrently inserted by using multiple threads, thereby significantly increasing an importing speed of benchmark data. When the OplogDump list is imported and residual data is imported from the Oplog of the MongoDB, the data independence between the rows is utilized, Hash grouping is performed on the Oplog based on the ObjId of the Oplog, and different groups are concurrently imported, thereby significantly increasing an importing speed of incremental data. For the input/output isolation between different shards of a same table, data migration between the different shards may be concurrently performed, and the concurrence of the migration is flexibly controlled by a central control node.

The data migration efficiency in one embodiment of the present disclosure is compared with the data migration of the native MongoDB in the existing technology below. For a data set having a same size, a migration speed in the native MongoDB migration solution is far less than that of the CMongo in one embodiment of the present disclosure. It may be learned from Table 1 that a speed difference is more than 10 times.

| Size of a single piece of data | Time consumption of the native migration | Time consumption of the CMongo |
| --- | --- | --- |
| 128 B | 7.5 Hour | 37 minutes |

The concurrence of native data migration of the MongoDB in the conventional technology is not enough. Consequently, the data migration efficiency is very low. The data independence is fully utilized in one embodiment of the present disclosure, and a multiple-thread concurrent migration technology is used, thereby fully increasing the data migration efficiency. In one embodiment of the present disclosure, a data backup file is used for data migration. This is different from on-line real-time data migration used in the native MongoDB. The real-time data migration of the MongoDB affects the read/write performance of a source database.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also know that all the embodiments described in this specification are preferred embodiments, and the related actions and modules are not necessarily required in the present disclosure.

To better implement the foregoing solutions in the embodiments of the present disclosure, the following further provides related apparatuses configured to implement the foregoing solutions.

A data migration system shown in FIG. 1 is provided. The data migration system 100 includes a central control node 101, a first shard storage space 102, a second shard storage space 103, and a data backup subsystem 104.

The first shard storage space 102 is configured with a first agent node 1021, the second shard storage space 103 is configured with a second agent node 1031, chunks stored in the first shard storage space 102 are backed up to the data backup subsystem 104 by using the first agent node 1021, and chunks stored in the second shard storage space 103 are backed up to the data backup subsystem 104 by using the second agent node 1031.

The central control node 101 is configured to send a data migration command to the first agent node 1021.

The first agent node 1021 is configured to: after receiving the data migration command sent by the central control node 101, obtain a to-be-migrated first chunk by using the data backup subsystem 104.

The first agent node 1021 is further configured to send the to-be-migrated first chunk to the second agent node 1031.

The second agent node 1031 is configured to import the to-be-migrated first chunk into the second shard storage space 103.

In some embodiments of the present disclosure, the central control node 101 is further configured to: divide all data in a database table into multiple chunks; send some of the multiple chunks to the first agent node 1021, and send the rest of the multiple chunks to the second agent node 1031.

The first agent node 1021 is further configured to import the some chunks received into the first shard storage space 102.

The second agent node 1031 is further configured to import the other chunks received into the second shard storage space 103.

Figure 10A:
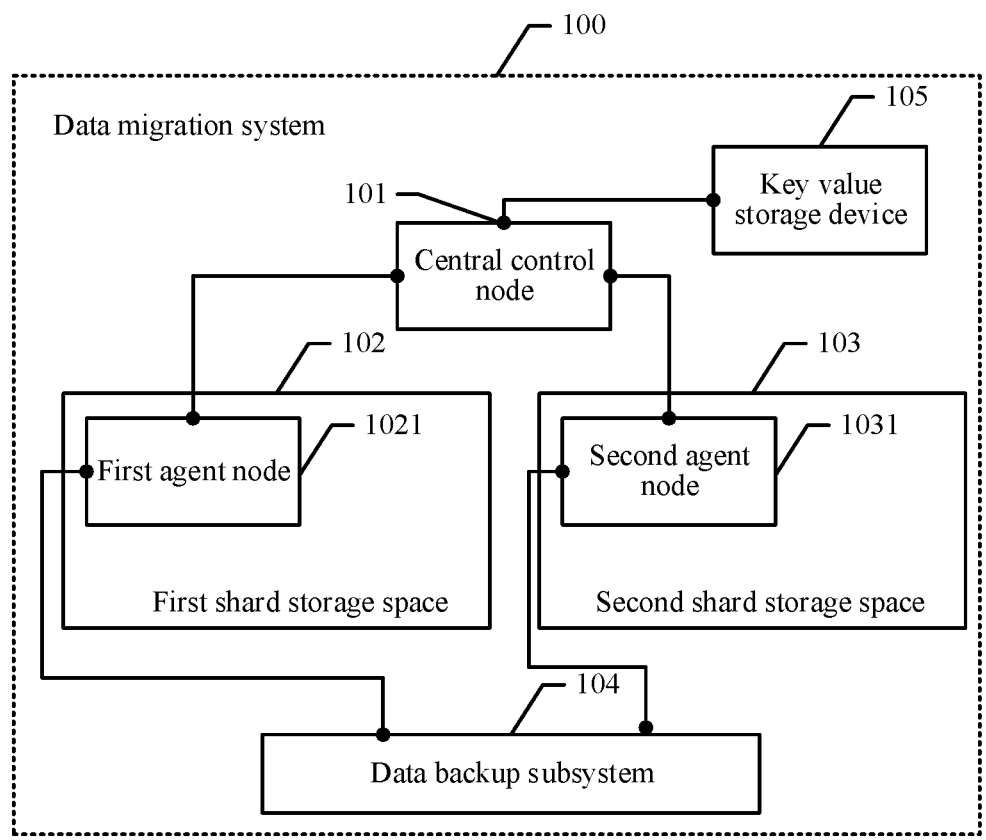
FIG. 10a is a schematic composition diagram of another data migration system according to an embodiment of the present disclosure.

In some embodiments of the present disclosure, referring to FIG. 10a, the data migration system 100 further includes a key value storage device 105.

The central control node 101 is further configured to: after dividing all data in the database table into multiple chunks, create a routing table based on the multiple chunks, where the routing table includes a mapping relationship between each of the multiple chunks and a shard identifier and a working status of a corresponding shard storage space, and the working status of the shard storage space corresponding to the chunk includes a normal state and a write forbidden state; and store the routing table in the key value storage device 105.

In some embodiments of the present disclosure, the second agent node 1031 is further configured to: after importing the to-be-migrated first chunk into the second shard storage space 103, report a migration success message to the central control node 101.

The central control node 101 is further configured to change the mapping relationship of the first chunk recorded in the routing table from the first shard storage space 102 to the second shard storage space 103 based on the migration success message.

Figure 10B:
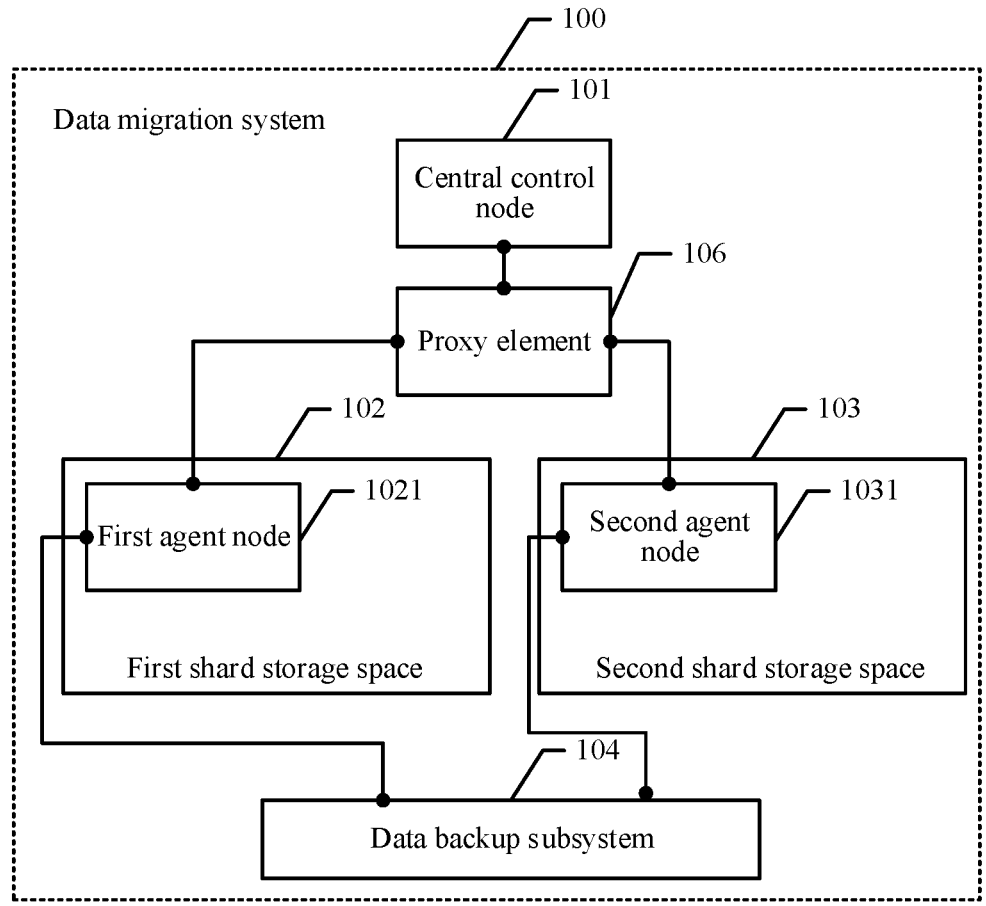
FIG. 10b is a schematic composition diagram of another data migration system according to an embodiment of the present disclosure.

In some embodiments of the present disclosure, referring to FIG. 10b, the data migration system 100 further includes a proxy element 106. Both the first agent node 1021 and the second agent node 1031 establish communications connection to the central control node 101 by using the proxy element 106.

The central control node 101 is further configured to: after changing the mapping relationship of the first chunk recorded in the routing table from the first shard storage space 102 to the second shard storage space 103 based on the migration success message, broadcast a storage space change message of the routing table to the first agent node and the second agent node by using the proxy element 106.

In some embodiments of the present disclosure, the first agent node 1021 is further configured to: before obtaining the to-be-migrated first chunk by using the data backup subsystem 104, send a route blocking request to the central control node 101.

The central control node 101 is further configured to change the working status of the first shard storage space 102 recorded in the routing table from the normal state to the write forbidden state based on the route blocking request.

The central control node 101 is further configured to broadcast a working status change message of the routing table to the proxy element.

The proxy element 106 is further configured to block an operation processing request of the first shard storage space 102 based on the working status change message of the routing table.

In some embodiments of the present disclosure, the central control node 101 is further configured to periodically initiate a backup task to the first agent node 1021 and the second agent node 1031.

The first agent node 1021 is further configured to periodically back up the chunks stored in the first shard storage space 102 to the data backup subsystem 104 based on the backup task.

The second agent node 1031 is further configured to periodically back up the chunks stored in the second shard storage space 103 to the data backup subsystem 104 based on the backup task.

In some embodiments of the present disclosure, the first agent node 1021 is specifically configured to: if it is the first time the first agent node 1021 receives the backup task after the first agent node 1021 starts and operates, back up all chunks currently stored in the first shard storage space 102, to generate a data snapshot, and back up the data snapshot to the data backup subsystem 104; or if it is not the first time the first agent node 1021 receives the backup task, obtain, from the first shard storage space 102, an incremental backup log used to record that the first shard storage space 102 is modified, and back up the incremental backup log to the data backup subsystem 104.

In some embodiments of the present disclosure, the first agent node 1021 is specifically configured to: obtain a to-be-migrated first data snapshot from the data backup subsystem 104; divide the first data snapshot into multiple snapshot blocks; and invoke multiple threads in a thread pool, to sift out a to-be-migrated snapshot block from the multiple snapshot blocks, where the to-be-migrated snapshot block belongs to the first chunk.

In some embodiments of the present disclosure, the first agent node 1021 is specifically configured to: after invoking the multiple threads in the thread pool to sift out the to-be-migrated snapshot block from the multiple snapshot blocks, obtain a to-be-migrated first incremental backup log from the data backup subsystem 104; and group the to-be-migrated first incremental backup log based on a log identifier, to obtain different groups of first incremental backup logs, where the different groups of first incremental backup log belong to the first chunk.

In some embodiments of the present disclosure, the first agent node 1021 is specifically configured to: after obtaining the to-be-migrated first incremental backup log from the data backup subsystem 104, obtain, from the first shard storage space 102 based on a backup timestamp corresponding to the first incremental backup log, a residual incremental log already stored from the backup timestamp to a current time, where the residual incremental log belongs to the first chunk.

In some embodiments of the present disclosure, the first agent node 1021 is specifically configured to: send the to-be-migrated snapshot block to the second agent node 1031; simultaneously send the different groups of first incremental backup logs to the second agent node 1031 by using different sending threads; and send the residual incremental log to the second agent node 1031.

It may be learned from the foregoing descriptions of one embodiment of the present disclosure that the data migration system includes the central control node, the first shard storage space, the second shard storage space, and the data backup subsystem. The data backup subsystem stores chunks of the first shard storage space and chunks of the second shard storage space. The central control node sends a data migration command to the first agent node, and the first agent node is a source node of data migration. After the first agent node receives the data migration command sent by the central control node, the first agent node obtains a to-be-migrated first chunk by using the data backup subsystem. The first agent node sends the to-be-migrated first chunk to the second agent node, and the second agent node is a destination node of the data migration. The second agent node imports the to-be-migrated first chunk into the second shard storage space. The central control node is disposed, independent of all shard storage spaces, in the data migration system, and migration of the first chunk is controlled by the central control node and is no longer limited by a distributed lock. Therefore, when there are multiple first chunks, each first chunk may be migrated independently. Therefore, the data migration efficiency is very high. In addition, when the first agent node in one embodiment of the present disclosure migrates the first chunk, the first agent node reads a first chunk backed up in advance from the data backup subsystem instead of reading the first chunk from the first shard storage space, the user still can normally complete a read/write operation on the first shard storage space.

Figure 11:
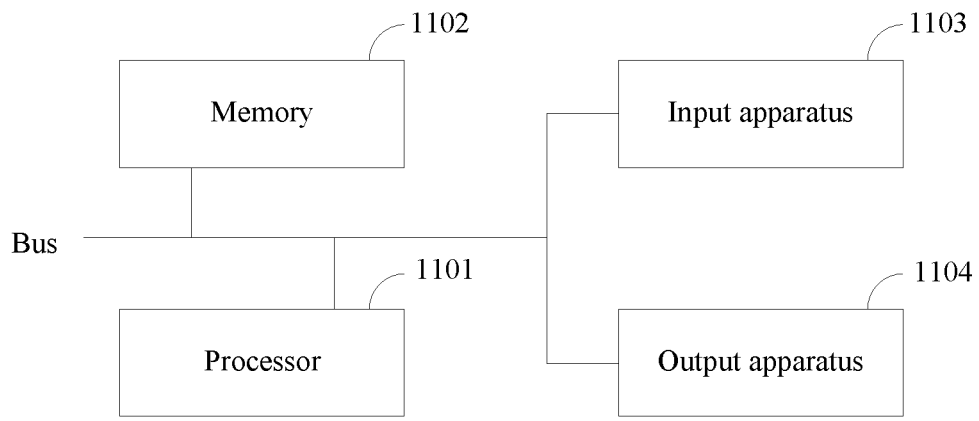
FIG. 11 is a schematic structural diagram of a data migration server according to an embodiment of the present disclosure.

An embodiment of the present disclosure further provides a server. As shown in FIG. 11, the server may include: a processor 1101, a memory 1102, an input apparatus 1103, and an output apparatus 1104. In the server, a quantity of the processors 1101 may be 1 or more. One processor is used as an example in FIG. 11. In some embodiments of the present disclosure, the processor 1101, the memory 1102, the input apparatus 1103, and the output apparatus 1104 may be connected by using a bus or in another manner. A bus connection is used as an example in FIG. 11.

The memory 1102 may be configured to store software programs and modules, and the processor 1101 performs various functions and data processing of the server by running the software programs and modules stored in the memory 1102. The memory 1102 may mainly include a program storage area and a data storage area. The program storage area may store an operating system, an application required by at least one function, and the like. In addition, the memory 1102 may include a high speed random access memory, and may further include a non-volatile memory, such as at least one magnetic disk storage device, a flash memory, or another volatile solid-state storage device. The input unit 1103 may be configured to: receive input digit or character information, and generate a key signal input related to user setting and function control of the server.

Specifically, in one embodiment, the processor 1101 may load, according to the following instructions, executable files corresponding to processes of one or more application programs into the memory 1102. The processor 1101 runs the application programs stored in the memory 1102, to implement any one of the data migration methods provided in the foregoing method embodiments.

An embodiment of the present disclosure provides a storage medium. The storage medium is configured to store program code, and the store program code is used to perform any one of the data migration methods provided in the foregoing method embodiments.

An embodiment of the present disclosure provides a computer program product including an instruction. The computer program product, when running on a computer, causes the computer to perform any one of the data migration methods provided in the foregoing method embodiments.

In addition, it should be noted that the apparatus embodiment described above is merely schematic. Units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments of the present disclosure, a connection relationship between modules represents that they have a communications connection. Specifically, the connection relationship may be implemented by using one or more communications buses or signal cables. Persons of ordinary skill in the art may understand and implement this application without creative efforts.

Through the descriptions of the foregoing implementation, persons skilled in the art may understand that the present disclosure may be implemented by using software and a necessary universal hardware platform. Certainly, the present disclosure may alternatively be implemented by using an application-specific integrated circuit, a dedicated CPU, a dedicated memory, a dedicated element, or the like. Generally, any function executed by using a computer program may be easily implemented by using corresponding hardware. Moreover, a specific hardware structure used to implement a same function may be various, for example, an analog circuit, a digital circuit, or a private circuit. However, for the present disclosure, using a software program for implementation is preferred. Based on this, the technical solutions of the present disclosure or the part that makes contributions to the prior art can be substantially embodied in the form of a software product. The computer software product is stored in a readable storage medium, for example, a floppy disk, a USB flash disk, a removable hard disk, a read-only memory (ROM), a random access memory (RAM), a magnetic disk, or an optical disc of the computer, and includes several instructions used to instruct a computer device (which may be a personal computer, a server, a network device, or the like) to perform the methods according to the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data migration method, applied to a data migration system, comprising:
    dividing, by a central control node of the data migration system, data in a database table into multiple chunks, each chunk being stored in a corresponding shard storage space and backed up in a data backup subsystem;
    creating, by the central control node, a routing table based on the multiple chunks, the routing table comprising a mapping relationship between the multiple chunks and shard storage spaces;
    sending, by the central control node, a data migration command to a first agent node of the data migration system, the first agent node being associated with a first shard storage space;
    obtaining, by the first agent node, a to-be-migrated chunk by using the data backup subsystem after the first agent node receives the data migration command sent by the central control node;
    sending, by the first agent node, the to-be-migrated chunk to a second agent node of the data migration system, the second agent node being associated with a second shard storage space;
    importing, by the second agent node, the to-be-migrated chunk into the second shard storage space;
    reporting, by the second agent node, a migration success message to the central control node, wherein the to-be-migrated chunk becomes a migrated chunk;
    modifying, by the central control node, the mapping relationship of the migrated chunk recorded in the routing table from the first shard storage space to the second shard storage space based on the migration success message; and
    broadcasting, by the central control node, a storage space change message of the routing table to the first agent node and the second agent node.

2. The method according to claim 1, further comprising:
    sending, by the central control node, one or more chunks of the multiple chunks to the first agent node, and sending remaining chunks of the multiple chunks other than the one or more chunks to the second agent node;
    importing, by the first agent node, the one or more chunks into the first shard storage space; and
    importing, by the second agent node, the remaining chunks into the second shard storage space.

3. The method according to claim 1, wherein the data migration system further comprises a key value storage device; the routing table comprises a shard identifier and a working status of each shard storage space, the working status of the shard storage space being one of: a normal state and a write forbidden state; and the method further comprises:
    storing, by the central control node, the routing table in the key value storage device.

4. The method according to claim 1, wherein the data migration system further comprises a proxy element; and
    the proxy element is used by the central control node to broadcast the storage space change message of the routing table to the first agent node and the second agent node.

5. The method according to claim 4, wherein before obtaining, by the first agent node by using the data backup subsystem, the to-be-migrated chunk, the method further comprises:
    sending, by the first agent node, a route blocking request to the central control node;
    changing, by the central control node, a working status of the first shard storage space recorded in the routing table from a normal state to a write forbidden state based on the route blocking request;
    broadcasting, by the central control node, a working status change message of the routing table to the proxy element; and
    blocking, by the proxy element, an operation processing request of the first shard storage space based on the working status change message of the routing table.

6. The method according to claim 1, further comprising:
    initiating, by the central control node, a backup task to the first agent node and the second agent node periodically;
    backing up, by the first agent node, chunks stored in the first shard storage space to the data backup subsystem periodically based on the backup task; and
    backing up, by the second agent node, chunks stored in the second shard storage space to the data backup subsystem periodically based on the backup task.

7. The method according to claim 6, wherein backing up, by the first agent node, the chunks stored in the first shard storage space to the data backup subsystem periodically based on the backup task comprises: backing up, by the first agent node if a first time that the first agent node receives the backup task after the first agent node starts and operates, all chunks currently stored in the first shard storage space, to generate a data snapshot, and backing up the data snapshot to the data backup subsystem; and obtaining, by the first agent node from the first shard storage space if not the first time that the first agent node receives the backup task, an incremental backup log that records a modification occurred to the first shard storage space, and backing up the incremental backup log to the data backup subsystem.

8. The method according to claim 1, wherein obtaining, by the first agent node by using the data backup subsystem, the to-be-migrated chunk comprises:

obtaining, by the first agent node, a data snapshot corresponding to the first shard storage space from the data backup subsystem;

dividing, by the first agent node, the data snapshot into multiple snapshot blocks; and invoking, by the first agent node, multiple threads in a thread pool, to identify a to-be-migrated snapshot block from the multiple snapshot blocks, the to-be-migrated snapshot block belonging to the to-be-migrated chunk.

9. The method according to claim 8, wherein obtaining, by the first agent node by using the data backup subsystem, the to-be-migrated chunk further comprises:

obtaining, by the first agent node after the first agent node invokes the multiple threads in the thread pool to identify the to-be-migrated snapshot block from the multiple snapshot blocks, to-be-migrated first incremental backup logs from the data backup subsystem; and grouping, the first agent node, the to-be-migrated incremental backup logs based on a log identifier, to obtain multiple groups of first incremental backup logs, the multiple groups of first incremental backup log belonging to the to-be-migrated chunk.

10. The method according to claim 9, wherein the obtaining, by the first agent node by using the data backup subsystem, a to-be-migrated chunk further comprises:

obtaining, by the first agent node based on a backup timestamp corresponding to the first incremental backup log after the first agent node obtains the to-be-migrated incremental backup log from the data backup subsystem, a residual incremental log in the first shard storage space stored during a period from the backup timestamp to a current time, the residual incremental log belonging to the to-be-migrated chunk.

11. The method according to claim 10, wherein sending, by the first agent node, the to-be-migrated chunk to the second agent node comprises:

sending, by the first agent node, the to-be-migrated snapshot block to the second agent node;

simultaneously sending, by the first agent node, the multiple groups of first incremental backup logs to the second agent node by using multiple sending threads; and sending, by the first agent node, the residual incremental log to the second agent node.

12. The method according to claim 1, wherein migration of the to-be-migrated chunk from the first chard storage space to the second shard storage space is performed free from a distributed lock of the database table.

13. A data migration system, comprising: a central control node, a first shard storage space configured with a first agent node, and a second shard storage space configured with a second agent node, wherein:

the central control node is configured to:

divide data in a database table into multiple chunks, each chunk being stored in a corresponding shard storage space and backed up in a data backup subsystem;

create a routing table based on the multiple chunks, the routing table comprising:

a mapping relationship between the multiple chunks and shard storage spaces; and send a data migration command to the first agent node;

the first agent node is configured to:

after receiving the data migration command sent by the central control node, obtain a to-be-migrated chunk by using the data backup subsystem; and send the to-be-migrated chunk to the second agent node; and the second agent node is configured to import the to-be-migrated chunk into the second shard storage space; and report a migration success message to the central control node, wherein the to-be-migrated chunk becomes a migrated chunk;

wherein the central control node is further configured to modify the mapping relationship of the migrated chunk recorded in the routing table from the first shard storage space to the second shard storage space based on the migration success message; and broadcast a storage space change message of the routing table to the first agent node and the second agent node.

14. The system according to claim 13, wherein the central control node is further configured to: send one or more chunks of the multiple chunks to the first agent node, and send remaining chunks of the multiple chunks other than the one or more chunks to the second agent node;

the first agent node is further configured to import the one or more chunks into the first shard storage space; and the second agent node is further configured to import the remaining chunks into the second shard storage space.

15. The system according to claim 13, wherein the data migration system further comprises a key value storage device;

the routing table comprises a shard identifier and a working status of each shard storage space, the working status of the shard storage space being one of: a normal state and a write forbidden state; and the central control node is further configured to:

store the routing table in the key value storage device.

16. The system according to claim 13, wherein the data migration system further comprises a proxy element; and the proxy element is used by the central control node to broadcast the storage space change message of the routing table to the first agent node and the second agent node.

17. The system according to claim 16, wherein the first agent node is further configured to: before obtaining the to-be-migrated chunk by using the data backup subsystem, send a route blocking request to the central control node;

the central control node is further configured to change a working status of the first shard storage space recorded in the routing table from a normal state to a write forbidden state based on the route blocking request;

the central control node is further configured to broadcast a working status change message of the routing table to the proxy element; and the proxy element is further configured to block an operation processing request of the first shard storage space based on the working status change message of the routing table.

18. The system according to claim 13, wherein the central control node is further configured to periodically initiate a backup task to the first agent node and the second agent node;

the first agent node is further configured to periodically back up the chunks stored in the first shard storage space to the data backup subsystem based on the backup task; and the second agent node is further configured to periodically back up the chunks stored in the second shard storage space to the data backup subsystem based on the backup task.

19. The system according to claim 18, wherein: when backing up the chunks stored in the first shard storage space to the data backup subsystem periodically based on the backup task, the first agent node is further configured to: back up, if a first time that the first agent node receives the backup task after the first agent node starts and operates, all chunks currently stored in the first shard storage space, to generate a data snapshot, and back up the data snapshot to the data backup subsystem; and obtain, from the first shard storage space if not the first time that the first agent node receives the backup task, an incremental backup log that records a modification occurred to the first shard storage space, and back up the incremental backup log to the data backup subsystem; and when obtaining the to-be-migrated chunk, the first agent node is further configured to: obtain a data snapshot corresponding to the first shard storage space from the data backup subsystem; divide the data snapshot into multiple snapshot blocks; and invoke multiple threads in a thread pool, to identify a to-be-migrated snapshot block from the multiple snapshot blocks, the to-be-migrated snapshot block belonging to the to-be-migrated chunk.

20. A non-transitory computer-readable storage medium storing computer program instructions which, when being executable by at least one processor of a data migration system, cause the data migration system to perform:

dividing, by a central control node of the data migration system, data in a database table into multiple chunks, each chunk being stored in a corresponding shard storage space and backed up in a data backup subsystem;

creating, by the central control node, a routing table based on the multiple chunks, the routing table comprising: a mapping relationship between the multiple chunks and shard storage spaces;

sending, by the central control node, a data migration command to a first agent node of the data migration system, the first agent node being associated with a first shard storage space;

obtaining, by the first agent node, a to-be-migrated chunk by using the data backup subsystem after the first agent node receives the data migration command sent by the central control node;

sending, by the first agent node, the to-be-migrated chunk to a second agent node of the data migration system, the second agent node being associated with a second shard storage space;

importing, by the second agent node, the to-be-migrated chunk into the second shard storage space;

reporting, by the second agent node, a migration success message to the central control node, wherein the to-be-migrated chunk becomes a migrated chunk;

modifying, by the central control node, the mapping relationship of the migrated chunk recorded in the routing table from the first shard storage space to the second shard storage space based on the migration success message; and broadcasting, by the central control node, a storage space change message of the routing table to the first agent node and the second agent node.

\* \* \* \* \*